United States Patent [19]
Sternowski

[11] Patent Number: 5,973,308
[45] Date of Patent: Oct. 26, 1999

[54] EFFICIENT DIELECTRIC HEATER

[75] Inventor: Robert Henry Sternowski, Cedar Rapids, Iowa

[73] Assignee: Rockwell Science Center, Inc., Thousand Oaks, Calif.

[21] Appl. No.: 08/906,414

[22] Filed: Aug. 5, 1997

[51] Int. Cl.⁶ ................................................. H05B 6/62
[52] U.S. Cl. ......................... 219/770; 219/772; 219/777
[58] Field of Search .................................. 219/764, 767, 219/770–780

[56] References Cited

U.S. PATENT DOCUMENTS

| | | | |
|---|---|---|---|
| 3,146,141 | 8/1964 | Woodland | 219/780 |
| 3,330,932 | 7/1967 | Gros | 219/764 |
| 3,532,848 | 10/1970 | Loring, Jr. et al. | 219/780 |
| 3,742,180 | 6/1973 | Bradley | 219/764 |
| 3,848,038 | 11/1974 | Dench | 264/26 |
| 4,140,013 | 2/1979 | Storm, III | 128/404 |
| 4,596,682 | 6/1986 | Mosier | 264/26 |
| 4,629,851 | 12/1986 | Holle | 219/764 |
| 4,823,811 | 4/1989 | Harrison | 219/780 |
| 5,543,604 | 8/1996 | Taylor | 219/643 |

*Primary Examiner*—Tu Ba Hoang
*Attorney, Agent, or Firm*—Kyle Eppele; James P. O'Shaughnessy

[57] ABSTRACT

A novel dielectric heater including a RF source having a first impedance, a parallel plate mold having a second impedance, and an impedance network, matching the first impedance to the second impedance, connected to the RF source and the parallel plate mold. The impedance network may be connected in series with the RF source and the parallel plate mold. The RF source may include a RF terminal and a common terminal, the impedance network may include a first terminal, connected to the RF terminal, and a second terminal, and the parallel plate mold may include a first plate, connected to the second terminal of the impedance network, and a second plate, connected to the common terminal of the RF source. In an alternative embodiment the novel dielectric heater includes parallel plates divided into a number of series-connected cells. The series cells lower the capacitive component, and may be configured such that an impedance of the parallel plate mold approximates an impedance of the RF source.

15 Claims, 3 Drawing Sheets

EFFICIENT DIELECTRIC HEATER

BACKGROUND

This invention relates to efficient dielectric heaters for relatively non-conductive materials.

There are several benefits to an efficient process for recycling discarded plastics, such as polystyrene and styrofoam, into new, useful products. For example, consuming scrap plastic such as packing "peanuts" and styrofoam cups or dishes, rather than discarding the scrap plastic, has a beneficial impact on the environment by lessening the demand for landfill space. Additionally, recycling scrap may result in a lower demand for the raw materials and energy necessary to produce new plastic, once again benefiting the environment.

One known end use for recycled plastics is the creation of fire-retardant construction materials. For example, U.S. Pat. No. 4,596,682 discloses a plastic polymer for bonding shredded styrofoam chips into molded foam insulating panels and blocks for the construction industry. A significant feature of the polymer is that it produces a fire-retardant foam product, as opposed to high flammability typical of polystyrene and styrofoam.

Molded plastic items may be manufactured by creating a mold of the desired item introducing plastic resin into the mold, and heating the plastic resin until it begins to "cure" (heating the plastic until an exothermic reaction commences). One method of heating the plastic is to apply radiant heat. However, in practice, it was found that radiant heat sources simply cured or charred the outer surface of the plastic, but left the inside uncured. Thus, a different form of heating was required.

Another method of curing recycled plastics in a mold is to apply non-radiant heating. One form of non-radiant heating is microwave heating which heats primarily by agitating water molecules (which are resonant at 2.45 GHz) in the material to be heated. Microwave heating subjects poorly conductive materials to antenna-launched electromagnetic energy at microwave frequencies, typically at frequencies of about 2.45 GHz. U.S. Pat. No. 3,848,038 discloses an example of heating nonconductive materials with microwave energy. The thickness, size, and composition of material to be heated, however, limits the applicability of microwave heating.

Another form of non-radiant heating is dielectric heating. Similar to microwave heating, dielectric heating occurs when an electrically non-conductive material is subjected to radiofrequency ("RF") energy. However, dielectric electric field, that is, between flat parallel plates of a capacitor, rather than an antenna, and at lower frequencies, typically 3–30 MHz, than microwave heating.

In dielectric heating, the electric field is generated by applied equal and opposite potentials on the two opposing metal plates of a capacitor. In a typical mold, the capacitor plates form the sides of the mold. A radio frequency power source ("RF source") is applied to the capacitor plates. Typically, one plate and one side of the RF source are at ground, and the other plate is connected to the high side of the RF source. The material to be molded is inserted between two plates of a capacitor. When the molding compound is a plastic resin, the dielectric heating will raise the resin to its polymerization point, triggering an exothermic reaction and hardening the resin.

One problem with known dielectric heating is poor efficiency. For example, one known dielectric heater uses a 20 kilowatt RF source. This known dielectric heater puts a workpiece between the plates of a capacitor comprising a parallel resonant tank circuit of a vacuum tube power oscillator. However, the electrical impedance of the capacitor is low in comparison to the high impedance of a typical vacuum tube plate circuit. This impedance mismatch results in poor efficiency.

Another problem with known dielectric heating is a practical limit to the size of mold. Any given mold has a resonant frequency that depends on the area of the plates of the capacitor that form the mold. Efficient transfer of power from the RF source to the mold occurs when the RF source is tuned to oscillate at the resonant frequency of the mold. The larger the area of the mold, the lower the resonant frequency. Thus, large molds resulted in low resonant frequencies, and therefore required low frequency RF sources. However, plastics are typically more efficient at absorbing high frequency RF energy than low frequency RF energy. Thus, large size, low resonant frequency molds were inefficient in transmitting RF energy to the plastic to be heated. In practice, molds, and therefore finished pieces, were typically limited to approximately to 24 inches by 48 inches.

Additionally, the electrical properties of a mold comprise a complex impedance, with the capacitive reactance far exceeding the resistive component. A significant disadvantage caused by this impedance is that only the small resistive components cause the desired dielectric heating via E-field losses. Also, the large capacitive component typically resulted in a significant impedance mismatch between the mold and the RF source.

One aspect of the present invention is to provide a novel dielectric heater including a RF source having a first impedance, a parallel plate mold having a second impedance, and an impedance network, matching the first impedance to the second impedance, connected to the RF source and the parallel plate mold. The impedance network may be connected in series with the RF source and the parallel plate mold. The RF source may include a RF terminal and a common terminal, the impedance network may include a first terminal, connected to the RF terminal, and a second terminal, and the parallel plate mold may include a first plate, connected to the second terminal of the impedance network, and a second plate, connected to the common terminal of the RF source.

Another aspect of the present invention is to provide a novel dielectric heater including a RF source and a parallel plate mold, where the parallel plates are divided into a number of series-connected cells. According to this aspect, the series cells lower the capacitive component, and may be configured such that an impedance of the parallel plate mold approximates an impedance of the RF source.

Another aspect of the present invention is to provide a dielectric heater including a RF source and a parallel plate mold, where the parallel plates are divided into a number of series-connected cells, and an impedance network to match the impedance of the RF source to the series-connected cells.

DETAILED DESCRIPTION

Figure 1:
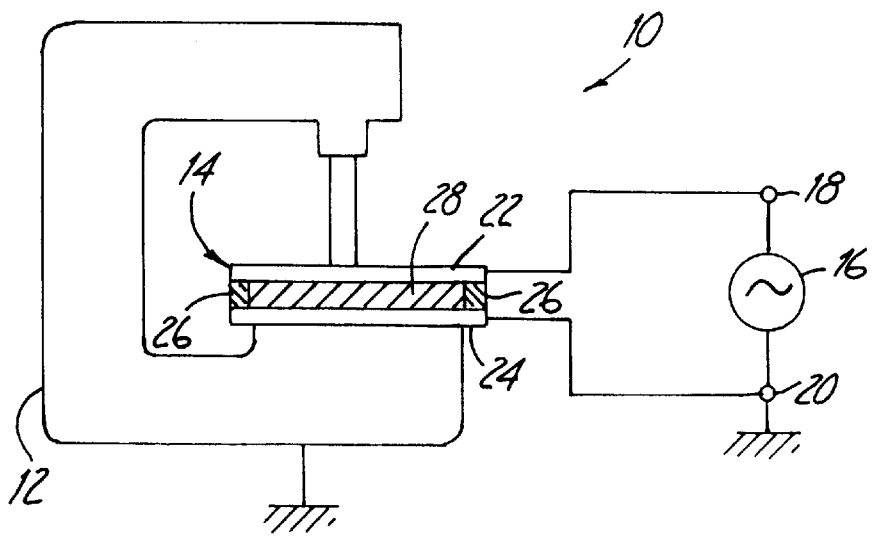
FIG. 1 is a diagrammatic illustration of a prior art dielectric heater.

A typical known dielectric heater 10 is shown in FIG. 1. The apparatus includes a hydraulic press 12, a parallel plate mold 14, and an RF source 16. The hydraulic press 12 is connected to ground (i.e., earth potential). Ground may be provided by a ground rod (not shown) driven into the soil and electrically connected to the hydraulic press 12, or by any other of many well-known grounding techniques. The RF source 16 has a RF terminal 18 and a common terminal 20. The common terminal 20 of the RF source 16 is typically connected to ground.

The parallel plate mold 14 includes a top plate 22, a bottom plate 24, and a fence 26. A workpiece 28 to be molded is between the top plate 22 and the bottom plate 24. The top plate 22, the bottom plate 24, and the workpiece 28 comprise a capacitive-resistive impedance. The top plate 22 and bottom plate 24 are electrically conductive, and typically comprised of metal. The bottom plate 24 is connected to the common terminal 20 of the RF source 16 and the top plate 22 is connected to the RF terminal 18 of the RF source 16, as shown.

In operation, the parallel plate mold 14 typically applies uniform pressure across the workpiece 28. Pressure is applied by the hydraulic press 12. The RF source 16 is energized to provide RF energy. The workpiece 28 absorbs RF energy and is heated, curing the workpiece 28.

Known dielectric heaters inefficiently use high-power RF sources to heat the workpiece. High power RF sources are required in previously known dielectric heaters because the RF sources are not impedance matched to the parallel plate mold, but rather used "brute force" power. The actual electrical impedance of a parallel plate mold is very small in comparison to the high impedance of a typical vacuum tube plate circuit, a common RF source.

Figure 2:
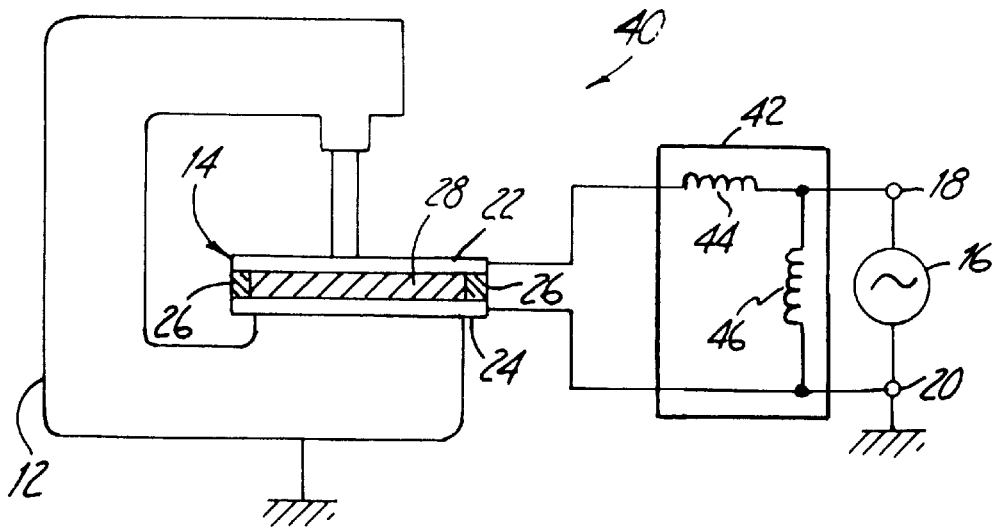
FIG. 2 is a diagrammatic illustration of a dielectric heater according to one embodiment of the present invention.

Referring to FIG. 2 there is shown one embodiment of an impedance-matched dielectric heater 40. The impedance-matched dielectric heater 40 includes a hydraulic press 12, a parallel plate mold 14, an impedance matching network 42, and a RF source 16. The hydraulic press 12 is connected to ground. The RF source 16 has a RF terminal 18 and a common terminal 20. The common terminal 20 of the RF source 16 may be electrically connected to ground.

The parallel plate mold 14 includes a top plate 22, a bottom plate 24, and a fence 26. The top plate 22, the bottom plate 24, and a workpiece 28 comprise a complex impedance, including capacitive impedance and resistive impedance. The top plate 22 and the bottom plate 24 are electrically conductive, and typically comprised of metal. The top plate 22 and bottom plate 24 metal should be selected to be resistant to the chemical reaction of the curing resin or escaping steam. The top plate 22 and the bottom plate 24 should not be so thin of a foil that they will tear or puncture during use. The bottom plate 24 is typically at ground and thus may be connected to the hydraulic press 12, which is also typically grounded. The top plate 22 is typically connected to the RF terminal 18 of the RF power source 16. However, the potentials of the top plate 22 and the bottom plate 24 may be reversed if desired.

The fence 26 comprising the sides of the parallel plate mold 14 should be of high dielectric strength material such that the fence 26 offers a much higher-resistance electrical path to the RF energy than does a workpiece 28 disposed between the top plate 22 and the bottom plate 24. Dielectric strength may vary with respect to the frequency, so dielectric strength is typically evaluated in the frequency range of the RF source 16. Commonly used materials for the fence 26 include FR4, Ryton, teflon and ceramic. Additional variants of the epoxy-glass family of materials may also be acceptable.

The parallel plate mold 14 typically applies uniform pressure across a workpiece 28 disposed between the top plate 22 and the bottom plate 24. Pressure is applied by the hydraulic press 12. The parallel plate mold should also be easily filled and then emptied after curing. The parallel plate mold 14 may be mounted in any orientation. A continuous process mold may also be implemented.

There are certain physical considerations typically given to the design of a parallel plate mold 14. The parallel plate mold 14 is typically designed to withstand temperatures of at least 110–130 Celsius. The parallel plate mold should be designed to withstand an estimated molding pressure of 25,000–30,000 lbs. Generally, one-tenth inch spacing for each kilovolt of applied potential is provided between the top plate 22 and the bottom plate 24 to reduce the possibility of an electrical arc between the top plate 22 and the bottom plate 24. The spacing may be doubled for very humid environments, such as a process that requires venting of steam. A mechanically durable sheet of high-dielectric material (e.g., 0.060 inch thick sheet of Teflon) on the bottom of the parallel plate mold 14, covering completely the bottom plate 24, further reduces the possibility of an unwanted electrical arc.

The plate coupled to the RF terminal 18 of the RF source 16 (in the illustrated embodiment, the top plate 22) is electrically insulated from the hydraulic press 12. Design considerations for the electrical insulation include possible electrical arcs from the top plate 22 to the hydraulic press 12 and field perturbation. Electrical arcs may be prevented with an insulator a few inches thick. With respect to field perturbation, metal structures in the field proximity may act as a "parasitic capacitance" and diminish and/or distort the radio energy applied to the workpiece 28. Field perturbation may cause uneven heating and hence curing, degrading the quality of the finished workpiece 28. Such field perturbation is avoided by minimizing the capacitance from the top plate 22 to the hydraulic press 12. The capacitance from the top plate 22 to the hydraulic press 12 may be minimized by minimizing the parallel area of the hydraulic press 12 and maximizing the separation between the top plate 22 to the hydraulic press 12. A separation between the press hydraulic 12 and the top plate 22 of four times the thickness of the workpiece 28 is desirable in the illustrated embodiment. The total parasitic capacitance in the illustrated embodiment should be no more than one-tenth the parallel plate mold 14 capacitance.

Additional aspects may be considered in the construction of the top plate 22 and the bottom plate 24. For example, sharp points or edges are to be avoided. Points and edges may to "focus" the electric field and increase the potential at the point or edge, which may induce an arc to short circuit the RF mold. Typically, each corner is rounded to a minimum of about a 0.25 inch radius.

Due to safety and radio emission requirements, typically the parallel plate mold 14 may be enclosed in a Faraday cage (not shown). A satisfactory shield design will totally encompass the parallel plate mold 14, be constructed of metal (a mesh grid of 0.5–1 inch is satisfactory), be connected well to earth rods driven through the floor into the soil, and be easily opened/closed so as not to impede the efficiency of the manufacturing processing. Also, should the capacitor plates be touched by an individual while the RF power is being applied, the individual risks severe injury or death. Therefore, for safety considerations, the parallel plate mold 14 may include a positive disconnect means of inhibiting the RF power source while the cage is open and the parallel plate mold 14 is being filled or emptied. Additionally, a vapor hood (not shown) may be added to capture outgases from the curing process.

The complex impedance of the parallel plate mold 14 includes a resistive component and a reactive (mostly capacitive) component. During dielectric heating, real power is dissipated in the resistive component of the impedance of the parallel plate mold 14. Reactive power does not dielectrically heat the workpiece 28. The impedance-matching network 42 impedance matches the output impedance of the RF source to the resistive component of the parallel plate mold, while "tuning-out" the reactive component, thereby increasing efficiency.

In the illustrated embodiment, an "L" network comprising series inductor 44 and shunt inductor 46 is shown as providing the impedance matching. The series inductor 44 is connected in series with the RF terminal 18 of the RF source 16 and the top plate 22. The shunt inductor 46 is connected in parallel across the RF terminal 18 and the common terminal 20 of the RF source 16. However, various networks for achieving impedance matching are known, and any of these networks may be employed as necessary for a given RF source 16 and parallel plate mold 14.

The impedance of the parallel plate mold 14 is a function of the geometry of the parallel plate mold 14 and the electrical characteristics of the workpiece 28. The electrical characteristics of the workpiece 28 may vary as the workpiece 28 is heated, thereby causing the impedance of the parallel plate mold 14 to vary as well. In some cases, the electrical properties of the workpiece 28 will be sufficiently stable to allow the use of a fixed impedance-matching network 42. In other cases, it is contemplated that an automatically tuned impedance-matching network 42 may be used.

In practice, the impedance-matched dielectric heater 40 is more efficient that the previously known dielectric heater 10. In one embodiment, the impedance-matched dielectric heater 40, using a 1 kW RF source, heated a workpiece comparably with the previously known 20 kW RF source.

As the size of the desired workpiece 28 increases, so does the size of the top plate 22 and the bottom plate 24, thereby increasing the area of the parallel plate mold 14. Increasing the area of the parallel plate mold 14 generally increases the capacitance of the mold. The increased capacitance may have two detrimental effects on dielectric heating efficiency. First, the increased capacitance may render a feasible matching network more difficult, or even impossible, to achieve. As discussed above, impedance mismatching degrades dielectric heating efficiency. Second, the resonant frequency of the parallel plate mold 14 is lowered. Because workpieces typically absorb energy more readily at higher frequencies, lowering the resonant frequency of the parallel plate mold 14 results in a further reduction in efficiency.

Figure 3:
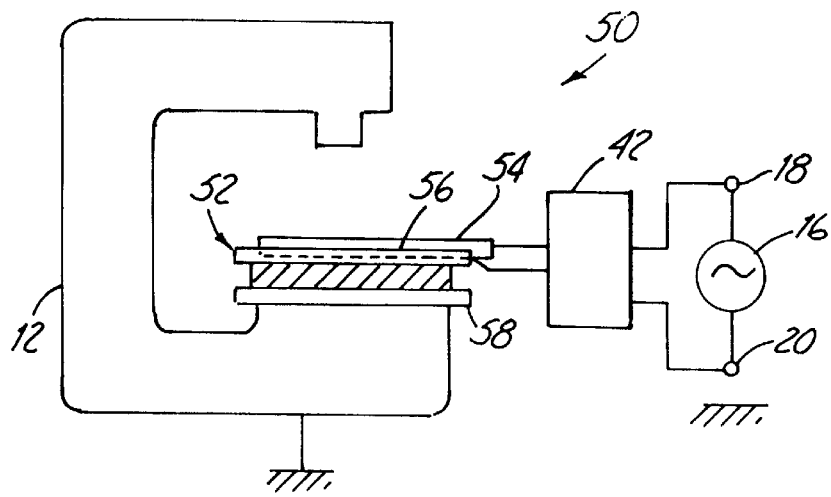
FIG. 3 is a diagrammatic illustration of a dielectric heater according to another embodiment of the present invention.

Referring to FIG. 3, there is shown one embodiment of a series cell dielectric heater 50 according to the invention. The series cell dielectric heater 50 includes a hydraulic press 12, a series cell mold 52, and a RF source 16. The hydraulic press is connected to ground. The RF source has a RF terminal 18 and a common terminal 20. As illustrated, the series cell dielectric heater can include impedance-matching network 42. However, as discussed below, inclusion of network 42 is not necessary and is therefore optional.

The series cell mold 52 illustrated in FIG. 3 is a type of parallel plate mold including a plurality of parallel plates. In the embodiment illustrated in FIG. 4 and FIG. 5, the series cell mold 52 includes a first RF potential plate 54, a second RF potential plate 56, and a floating potential plate 58. The first RF potential plate 54 is connected to the RF terminal 18 of the RF source 16. The second RF potential plate 56 is connected to the common terminal 20 of the RF source 16. The floating potential plate 58 is electrically insulated from the RF source 16 and from ground potential. The first RF potential plate 54 and the second RF potential plate 56 are generally located in the same plane, and are parallel and spaced apart from the plane of the floating potential plate 58. Generally, the area of first RF potential plate 54 and the second RF potential plate 56 are equal to maintain an equal voltage drop—and hence power dissipation—per unit area to assure even heating. However, should uneven heating of the workpiece 28 be desired, the areas of the RF potential plates may be varied.

Figure 5:
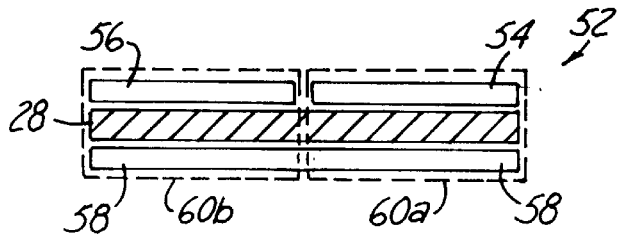
FIGS. 5 and 5A are side views of the series cell mold of FIG. 4.
Figure 5A:
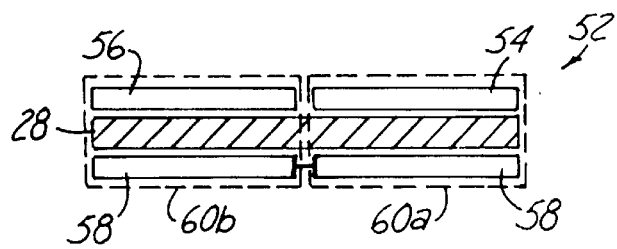
Figure 6:
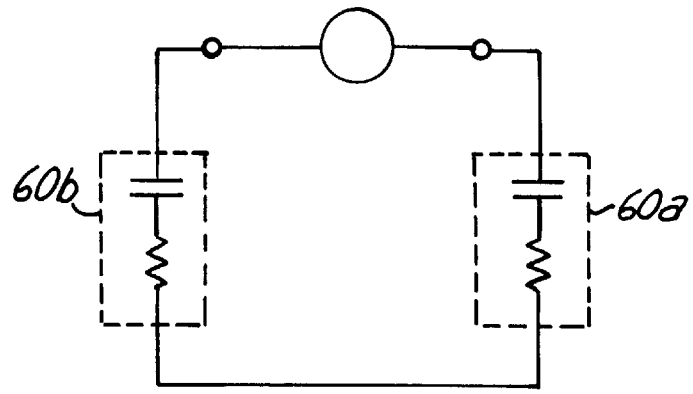
FIG. 6 is a schematic illustration of the electrical properties of the series cell mold of FIG. 4.

The first RF potential plate 54 and the portion of the floating potential plate 58 covered by the first RF potential plate 54 comprise a first cell 60a of the series cell mold 52. The second RF potential plate 56 and the portion of the floating potential plate 58 covered by the second RF potential plate 56 comprise a second cell 60b of the series cell mold 52. When the RF source 16 is energized, cell 60a and cell 60b create an electric field across the workpiece 28. As illustrated in FIG. 5 and FIG. 6, the floating potential plate 58 is physically part of both the first cell 60a and the second cell 60b, but may be modeled as two separate plates connected in series as shown in FIG. 5A. Thus, the first cell 60a is connected in series with the second cell 60b.

When the area of first RF potential plate 54 equals the area of the second RF potential plate 56, the first cell 60a and the second cell 60b have the same electrical impedance. The capacitance for the illustrated series cell mold 52 is one half the capacitance of one of the cells. Capacitance, in picofarads, is calculated as $0.225 \times E \times A$ (in$^2$)/T (in), where E=relative dielectric of material between plates, A=plate parallel area in square inches, and T=spacing between plates in inches. The resistance for the illustrated series cell mold 52 is twice the resistance of one of the cells.

Figure 4:
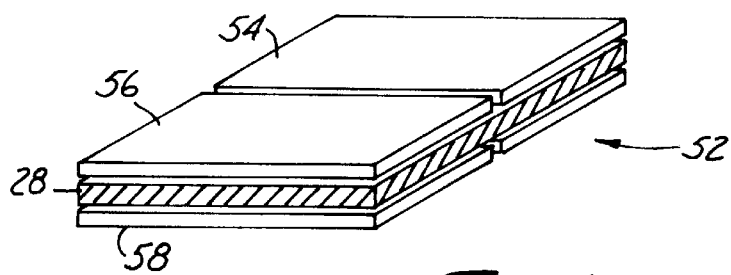
FIG. 4 is a perspective view of a series cell mold according to one embodiment of the present invention.
Figure 7:
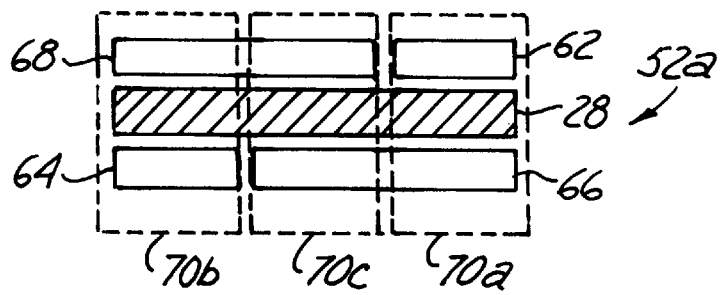
FIG. 7 is a side view of another series cell mold according to another embodiment of the present invention.
Figure 8:
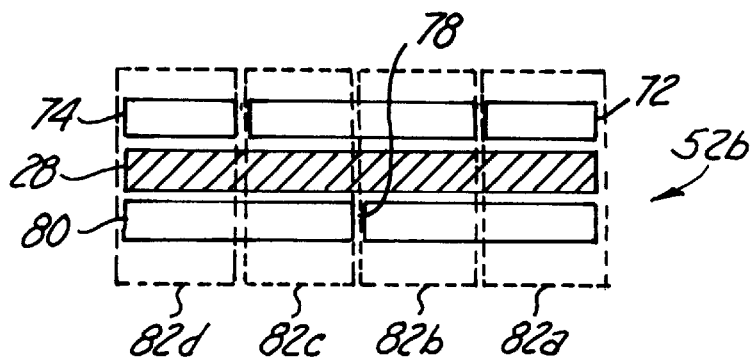
FIG. 8 is a side view of another series cell mold according to another embodiment of the present invention.

The embodiment that is illustrated in FIG. 4 & FIG. 5 and having two RF potential plates, thereby creating two cells, was given as the simplest and most easily described embodiment of the series cell mold 52. However, various quantities and geometric arrangements of cells may be desirable depending on any given mold or RF source 16. For example, FIG. 7 illustrates one embodiment of a three cell series cell mold 52a, having a first cell 70a comprising a first RF potential plate 62 spaced apart from a portion of a first floating plate 66, a second cell 70b comprising a second RF potential plate 64 spaced apart from a portion of a second floating potential plate 68, and a third cell 70c comprising a portion of the first floating plate 66 spaced apart from the second floating plate 68. Also, FIG. 8 illustrates one embodiment of a four cell series cell mold 52b, having a first cell 82a comprising a first RF potential plate 72 spaced apart from a portion of a first floating plate 76, second cell 82b comprising a portion of the first floating plate 76 spaced apart from a portion of a second floating plate 78, third cell 82c comprising a portion of the second floating plate 78 spaced apart from a portion of a third floating plate 80, and a fourth cell 82d comprising a second RF potential plate 74 spaced apart from a portion of the third floating potential plate 80.

The examples shown in FIG. 4 to FIG. 8 are illustrative embodiments. Many variations to the illustrated embodiments that will be apparent to one of ordinary skill in the art. The invention encompasses these many multi-cell arrangements and variations, including various numbers of cells, cell shapes, and cell configurations.

Where the areas of cells are equal, the total capacitance of the series mold 52 may be calculated as the capacitance of one cell divided by the number of cells. The total resistance is the resistance of one cell times the number of cells. Where the areas of the cells are not equal, the total capacitance of the series cell mold 52 may be calculated as the inverse of the sum of the inverse of the capacitance of each cell. The total resistance is the sum of the resistance of each cell.

A given desired impedance of the series plate mold 14 may be achieved with the appropriate selection of cell size, number of cells, and the electrical properties of the workpiece 28. The impedance of the series cell mold 52 may be designed to fall within an impedance tuning range of a standard RF source 16. Such a design would reduce the complexity of an otherwise expensive impedance matching network 42, or eliminate the impedance matching network completely, while retaining the high efficiency of an impedance-matched dielectric heater 40.

A given desired resonant frequency of the series cell mold 52 may also be achieved with the appropriate selection of cell size, number of cells, and the electrical properties of the workpiece 28. The resonant frequency of the series cell mold 52 may be designed to approximate a frequency that is within a tuning range of the RF source 16 and/or most efficiently absorbed by the workpiece 28. Such a design provides more efficient heating of the workpiece 28.

The series cell dielectric heater 50 of the present invention is capable of molding sheets up to 4 feet by 8, or larger, including materials suitable for building construction. In practice, a given mold may be a cassette of a size and shape unique to the workpiece 28 that it produces. The cassette is rolled into a dielectric heater of the present invention on a roller conveyer. The hydraulic press 12 compress a plunger on the parallel plate mold 14 cassette, and RF power is applied. Heating takes from 30 to 70 seconds, at which time the hydraulics are reversed and the parallel plate mold 14 cassette is rolled out of the press.

Specific embodiments of the invention have been described herein for purposes of illustrating the manner in which the invention may be made and used. It should be understood that implementation of other variations and modifications of the invention in its various aspects will be apparent to those skilled in the art, and that the invention is not limited thereto by the specific embodiments described. It is therefore contemplated to cover by the present invention any and all modifications, variations or equivalence that fall within the true spirit and scope of the basic underlying principles disclosed and claimed herein.

What is claimed is:

1. A dielectric heater, comprising:
   a RF source having a first impedance;
   a parallel plate mold, comprising a series cell mold, having a second impedance; and
   an impedance network, matching the first impedance to the second impedance, connected to the RF source and the parallel plate mold.

2. The dielectric heater of claim 1, wherein the impedance network is connected in series with the RF source and the parallel plate mold.

3. The dielectric heater of claim 1, wherein:
   the RF source further includes a RF terminal and a common terminal;
   the impedance network further includes a first terminal, connected to the RF terminal, and a second terminal; and
   the parallel plate mold further includes a first plate, connected to the second terminal of the impedance network, and a second plate, connected to the common terminal of the RF source.

4. The dielectric heater of claim 3, wherein the second plate of the parallel plate mold and the common terminal of the RF source are connected to ground.

5. The dielectric heater of claim 3, wherein the impedance network further includes a third terminal, connected to the second plate of the parallel plate mold and the common terminal of the RF source, the impedance network having an impedance across the first terminal and the third terminal substantially the same as the first impedance of the RF source, and an impedance across the second terminal and the third terminal substantially the same as the second impedance of the parallel plate mold.

6. The dielectric heater of claim 1 further comprising a press connected to the parallel plate mold.

7. (Amended) The dielectric heater of claim 1, wherein the series cell mold further includes a first impedance cell and a second impedance cell, the first impedance cell having a first RF plate coupled to the RF terminal of the RF source and a first floating plate, and the second impedance cell having a second RF plate coupled to the common terminal of the RF source and a second floating plate, the first floating plate being electrically coupled to the second floating plate.

8. The dielectric heater of claim 7, wherein the series cell mold consists of two impedance cells, and the first floating plate and the second floating plate comprise a unitary plate.

9. The dielectric heater of claim 7, wherein the series cell mold further includes a third impedance cell comprising a portion of the first floating plate spaced apart from a portion of the second floating plate.

10. The dielectric heater of claim 7, wherein the series cell mold further includes a third impedance cell and a fourth impedance cell, the third impedance cell comprising a portion of the first floating plate spaced apart and parallel to a first portion of a third floating plate, and the fourth impedance cell comprising a second portion of the third floating plate spaced apart and parallel to a portion of the second floating plate.

11. A dielectric heater, comprising:
    a RF source, having an RF terminal and a common terminal; and
    a series cell mold comprising first, second and third impedance cells, the first impedance cell having a first RF plate coupled to the RF terminal of the RF source and a first floating plate, the second impedance cell having a second RF plate coupled to the common terminal of the RF source and a second floating plate, and the third impedance cell having a portion of the first floating plate spaced apart from a portion of the second floating plate.

12. The dielectric heater of claim 11, wherein the impedance cells have substantially equal impedances.

13. The dielectric heater of claim 11, further comprising an impedance network, the impedance network connected between the first RF plate of the first impedance cell and the RF terminal of the RF source, and connected between the second RF plate of the second impedance cell and the common terminal of the RF source.

14. The dielectric heater of claim 13, wherein the impedance network matches a first impedance of the RF source to a second impedance of the series cell mold.

15. A process for dielectrically heating a relatively nonconductive material with an RF source having a predetermined electrical characteristics, wherein one of the predetermined electrical characteristics of the RF source is an electrical impedance of the RF source, the process comprising the steps of:

matching at least one electrical characteristic for a mold for the relatively nonconductive material to at least one predetermined electrical characteristic of the RF source, wherein the step of matching further comprises:

partitioning the mold into a plurality of series-connected impedance cells; and configuring an impedance of the plurality of series-connected impedance cells to match the impedance of the RF source;

generating RF energy with the RF source; and applying the RF energy to the mold.

* * * * *